United States Patent
Cardei et al.

(10) Patent No.: US 12,014,524 B2
(45) Date of Patent: *Jun. 18, 2024

(54) LOW-LIGHT CAMERA OCCLUSION DETECTION

(71) Applicant: WAYMO LLC, Mountain View, CA (US)

(72) Inventors: Vlad Cardei, Redwood City, CA (US); Carl Warren Craddock, San Francisco, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/140,225

(22) Filed: Apr. 27, 2023

(65) Prior Publication Data

US 2023/0267648 A1 Aug. 24, 2023

Related U.S. Application Data

(63) Continuation of application No. 17/112,023, filed on Dec. 4, 2020, now Pat. No. 11,670,005, which is a (Continued)

(51) Int. Cl.
*G06K 9/00* (2022.01)
*G06T 7/90* (2017.01)
(Continued)

(52) U.S. Cl.
CPC ............... *G06T 7/90* (2017.01); *G06V 10/25* (2022.01); *G06V 20/56* (2022.01); *G05D 1/0231* (2013.01); *G06T 2207/10024* (2013.01)

(58) Field of Classification Search
CPC .. G06K 9/00805; G06K 9/00201; G06K 9/46; G06K 9/4628; G06K 9/627; G06K 9/3241; G06K 9/00785; G06K 9/6256; G06K 9/6274; G06K 9/6277; G06K 9/78; B60Q 9/008; G06N 3/04; G06N 3/08; G06N 99/00; B60W 30/095; B60W 50/14; B60W 40/04; G06F 17/30241; A61B 5/18;
(Continued)

(56) References Cited

U.S. PATENT DOCUMENTS 8,491,135 B2 7/2013 Brown et al.
9,185,360 B2 11/2015 Stein et al.
(Continued)

OTHER PUBLICATIONS

Fowler , et al., "Read Noise Distribution Modeling for CMOS Image Sensors", BAE Systems Imaging Solutions, 1801 McCarthy Blvd., Milpitas, CA 95035 USA, 2013, 4 pages.

*Primary Examiner* — Duy M Dang
(74) *Attorney, Agent, or Firm* — Botos Churchill IP Law

(57) ABSTRACT

The technology relates to determining whether a camera is occluded. For instance, an image may be captured using a camera having red, green, and blue pixels each including a photosensor. Output values for the photosensors of each of the red pixels, green pixels, and blue pixels may be determined for the images. The output values of the green pixels may be compared to one or more of the output values of the red pixels or the output values of the blue pixels. That the camera is occluded is determined based on the comparison.

20 Claims, 9 Drawing Sheets
(1 of 9 Drawing Sheet(s) Filed in Color)

Related U.S. Application Data continuation of application No. 16/193,865, filed on Nov. 16, 2018, now Pat. No. 10,891,757.

(51) Int. Cl.
 *G06V 10/25* (2022.01)
 *G06V 20/56* (2022.01)
 *G05D 1/00* (2006.01)

(58) Field of Classification Search
 CPC ..... B60R 21/01538; G06T 7/80; G06T 7/254; G06T 7/248; G06T 7/90
 See application file for complete search history.

(56) References Cited

U.S. PATENT DOCUMENTS

| | | |
|---|---|---|
| 9,253,375 B2 | 2/2016 | Milanfar et al. |
| 9,420,276 B2 | 8/2016 | Liang et al. |
| 10,891,575 B2 | 1/2021 | Yamazaki et al. |
| 10,891,757 B2 | 1/2021 | Cardei et al. |
| 11,670,005 B2 * | 6/2023 | Cardei .................. G06V 20/56 382/104 |
| 2015/0271471 A1 | 9/2015 | Hsieh et al. |
| 2016/0209647 A1 | 7/2016 | Fürsich |
| 2018/0329602 A1 | 11/2018 | Akeley |

\* cited by examiner

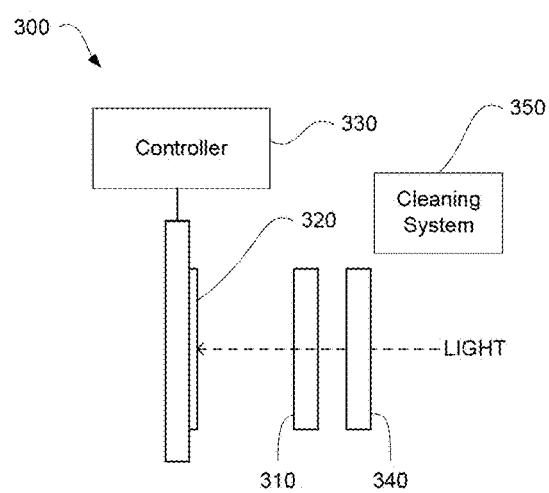
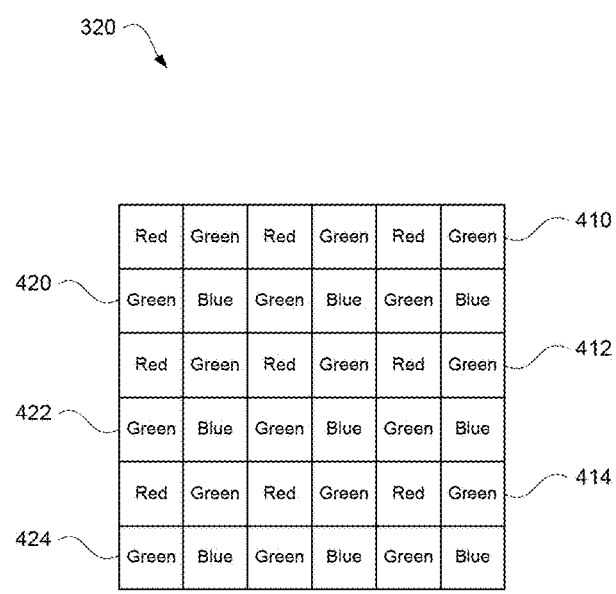
FIGURE 3
FIGURE 4

| LUX Level | 95th Percentile Value |
|---|---|
| 0 (occluded) | 14 |
| 1 | 15 |
| 5 | 18 |
| 10 | 22 |
| 20 | 30 |

LOW-LIGHT CAMERA OCCLUSION DETECTION

CROSS REFERENCE TO RELATED APPLICATIONS

This application is a continuation of U.S. application Ser. No. 17/112,023, filed Dec. 4, 2020, which is a continuation of U.S. application Ser. No. 16/193,865, filed on Nov. 16, 2018, issued as U.S. Pat. No. 10,891,757, the disclosures of which are incorporated herein by reference.

BACKGROUND

Autonomous vehicles, such as vehicles that do not require a human driver, can be used to aid in the transport of passengers or items from one location to another. Such vehicles may operate in a fully autonomous driving mode where passengers may provide some initial input, such as a destination, and the vehicle maneuvers itself to that destination. Thus, such vehicles may be largely dependent on systems that are capable of determining the location of the autonomous vehicle at any given time, as well as detecting and identifying objects external to the vehicle, such as other vehicles, stop lights, pedestrians, etc.

While such sensors come in many different configurations, as an example, such sensors may include ("light detection and ranging") LIDAR sensors, radar units, cameras, etc. In the camera example, in addition to configuration, the cameras have various features such as gain, exposure time, etc. which must be set to particular values in order to obtain useful images in different lighting conditions. However, in some instances, it may be possible for a camera to be unable to capture a useful image because the camera's lens is completely or partially occluded.

BRIEF SUMMARY

Aspects of the disclosure provide a method of determining whether a camera is occluded. The method includes capturing an image using the camera, the camera having red, green, and blue pixels each including a photosensor; determining, by one or more processors, output values for the photosensors of each of the red pixels, green pixels, and blue pixels for the image; comparing, by the one or more processors, the output values of the green pixels to one or more of the output values of the red pixels or the output values of the blue pixels; and based on the comparison, determining, by the one or more processors, that the camera is occluded.

In one example, the method also includes, determining chromaticity of the output values for the green pixels, and wherein the comparison is further based on the chromaticity of the output values for the green pixels. In this example, the chromaticity of the output values for the green pixels includes determining green pixel values G for the image using the equation $G=(Gr+Gb)/2$, where Gr represents output values for green pixels of red-green pixel rows of the camera and Gb represents output values for green pixels of blue-green pixel rows of the camera. In addition, the chromaticity of the output values for the green pixels g is determined using the equation $g=G/(R+B+G)$ where R represents red pixel values and B represents blue pixel values for the image. The method also includes determining R by summing the output values of the red pixels. In addition, the method also includes determining B by summing the output values of the blue pixels. In addition or alternatively, the method includes determining chromaticity of the output values for the red pixels using the equation $r=R/(R+B+G)$ where R represents red pixel values for the image, and B represents blue pixel values for the image, and wherein the comparison is further based on the chromaticity of the output values for the red pixels. In addition or alternatively, the method also includes determining chromaticity of the output values for the blue pixels using the equation $b=B/(R+B+G)$ where R represents red pixel values for the image, and B represents blue pixel values for the image, and wherein the comparison is further based on the chromaticity of the output values for the blue pixels. As another example, the comparison includes determining a ratio of chromaticity of the output values of the green pixels to one or more of chromaticity of the output values of the red pixels or chromaticity of the output values of the blue pixels. In this example, the comparison includes comparing the ratio of chromaticity of the output values of the green pixels to the chromaticity of the red pixels to a threshold value. In addition, the method includes determining the threshold value based on a gain used to capture the image. In addition or alternatively, the comparison includes comparing the ratio of chromaticity of the output values of the green pixels to the chromaticity of the blue pixels to a threshold value. In addition, the method includes determining the threshold value based on a gain used to capture the image. In addition or alternatively, the method also includes determining a chromaticity value m based on the output values of the red pixel values and the blue pixel values. In addition, determining the chromaticity value m includes using the equation $m=M/(R+B+G)$ where $M=(R+B)/2$, and where R represents red pixel values for the image and B represents blue pixel values for the image. In another example, the comparison includes determining a difference between chromaticity of the output values of the green pixels and a combined chromaticity of the output values of the red pixels and the output values of the blue pixels. In this example, the comparison includes comparing the difference to a threshold value. In addition, the method also includes determining the threshold value based on a gain used to capture the image. In another example, the method also includes sending a signal to activate a cleaning system in order to clean the camera based on the determination that the camera is occluded. In another example, the camera is attached to a vehicle having an autonomous driving mode, and the method further includes using the determination to control the vehicle in the autonomous driving mode.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 3 is an example functional diagram of a camera in accordance with aspects of the disclosure.

FIG. 4 is an example representation of a portion of an image sensor in accordance with aspects of the disclosure.

FIG. 9 is an example table in accordance with aspects of the disclosure.

DETAILED DESCRIPTION

Figure 1:
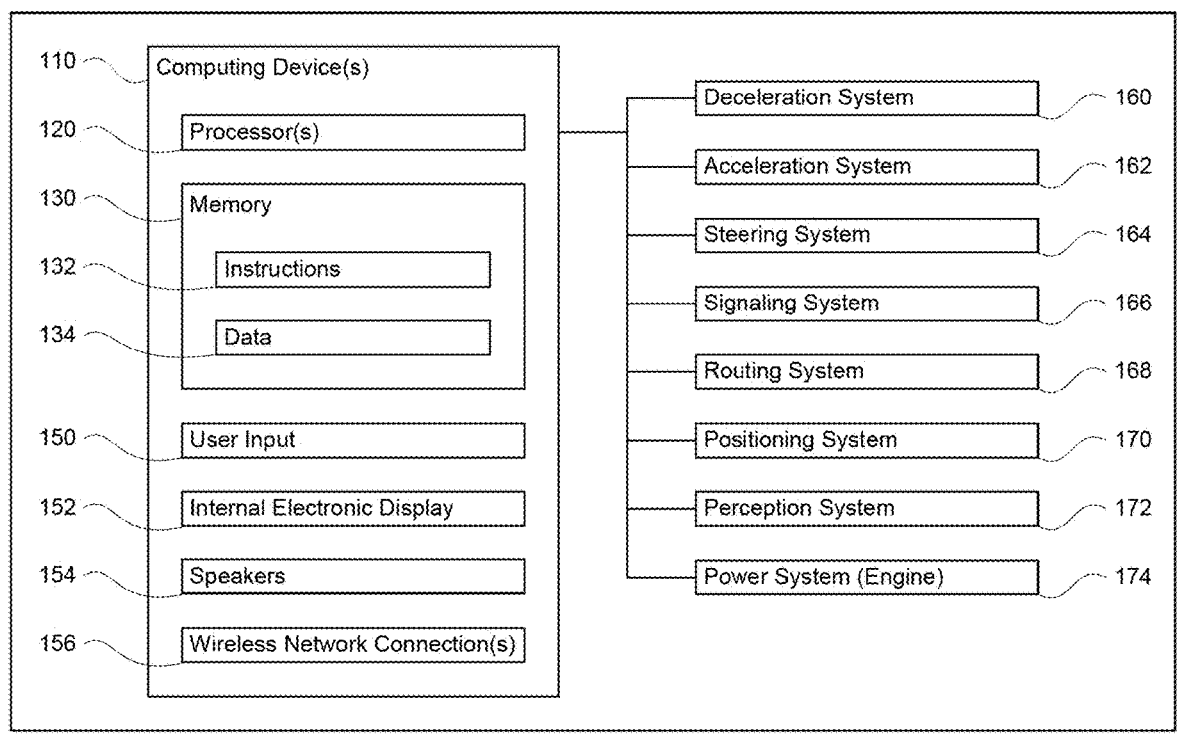
FIG. 1 is a functional diagram of an example vehicle in accordance with aspects of the disclosure according to aspects of the disclosure.

The technology relates to detecting whether a camera is observing something dark or is simply occluded. For instance, during daylight hours identifying whether a camera is occluded may be as simple as comparing with an image from another camera. However, in low ambient lighting conditions, such as at night time, it can be very difficult to determine occlusions with such comparisons. Understanding when a camera is occluded versus simply capturing an image of a dark scene may be especially useful in certain situations where critical decisions are made in real time using such images, such as in the case of autonomous vehicles which use camera images to make driving decisions.

A camera may include a lens which focuses light towards an image sensor which is attached to a processor which can process information from the image sensor. The image sensor may include a plurality of red, green and blue pixels. Each of these pixels may essentially be a photosensor with a filter which allows for red (red pixels), green (green pixels), or blue (blue pixels) light to pass through to the photosensor.

When a camera is completely occluded, very little or no light will pass through the filters to the photosensors. As such, output of the red, green and blue pixels will be very low or simply the underlying noise from these pixels will be about the same (though it will depend upon the configuration of the camera, the pixels themselves, as well as the gain and exposure time). However, when the camera is capturing a dark scene, while the output of the red and blue pixels will be very low, the output of the green pixels may be meaningfully greater than the red or the blue pixels. This is because the green pixels are more sensitive than the red and blue pixels.

In order to determine whether a camera is occluded or simply capturing a dark scene, the output of red, blue and green pixels of an image may be analyzed. This analysis may be independent of the type of camera or filter that is used so long as the camera includes the aforementioned red, blue, and green pixel configuration. For instance, the chromaticity of the green channel may be compared to that of the red and blue channels. If the differences or ratios of these comparisons are greater than a threshold value, then the camera is likely not occluded as more light being captured by the green pixels than the red pixels or the blue pixels. The actual thresholds used may be dependent upon the gain value used to capture the image. Once a camera is determined to be occluded, remedial actions may be taken.

The features described herein may allow for the detection of whether a camera is observing something dark or simply occluded using a simple yet effective analysis and thereby improving the operation of the camera. This determination may be made in real time, for instance, by processors of the camera or remote processing devices. Thus, the functionality of the camera can be self-assessed or automatically assessed and used to determine whether to clean the camera and/or notify a human operator. This can be especially useful in certain situations where the occlusion cannot be easily identified from a visual inspection by a human operator, for instance, because camera is not easily accessible or no human operator is available. Similarly, as noted above, this technology is also useful in situations where critical decisions are made in real time using such images, such as in the case of autonomous vehicles which use camera images to make driving decisions.

EXAMPLE SYSTEMS

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, busses, recreational vehicles, etc. The vehicle may have one or more computing devices, such as computing devices 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing devices 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing devices 110.

Accordingly, references to a processor or computing device will be understood to include references to a collection of processors or computing devices or memories that may or may not operate in parallel.

Computing devices 110 may include all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing devices 110 to provide information to passengers within the vehicle 100.

Computing devices 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

In one example, computing devices 110 may be an autonomous driving computing system incorporated into vehicle 100. The autonomous driving computing system may capable of communicating with various components of the vehicle in order to maneuver vehicle 100 in a fully autonomous driving mode and/or semi-autonomous driving mode. For example, returning to FIG. 1, computing devices 110 may be in communication with various systems of vehicle 100, such as deceleration system 160, acceleration system 162, steering system 164, signaling system 166, navigation system 168, positioning system 170, perception system 172, and power system 174 (for instance, a gasoline or diesel powered motor or electric engine) in order to control the movement, speed, etc. of vehicle 100 in accordance with the instructions 132 of memory 130. Again, although these systems are shown as external to computing devices 110, in actuality, these systems may also be incorporated into computing devices 110, again as an autonomous driving computing system for controlling vehicle 100.

As an example, computing devices 110 may interact with deceleration system 160 and acceleration system 162 in order to control the speed of the vehicle. Similarly, steering system 164 may be used by computing devices 110 in order to control the direction of vehicle 100. For example, if vehicle 100 is configured for use on a road, such as a car or truck, the steering system may include components to control the angle of wheels to turn the vehicle. Signaling system 166 may be used by computing devices 110 in order to signal the vehicle's intent to other drivers or vehicles, for example, by lighting turn signals or brake lights when needed.

Navigation system 168 may be used by computing devices 110 in order to determine and follow a route to a location. In this regard, the navigation system 168 and/or data 134 may store detailed map information, e.g., highly detailed maps identifying the shape and elevation of roadways, lane lines, intersections, crosswalks, speed limits, traffic signals, buildings, signs, real time traffic information, vegetation, or other such objects and information. In other words, this detailed map information may define the geometry of vehicle's expected environment including roadways as well as speed restrictions (legal speed limits) for those roadways. In addition, this map information may include information regarding traffic controls, such as traffic signal lights, stop signs, yield signs, etc., which, in conjunction with real time information received from the perception system 172, can be used by the computing devices 110 to determine which directions of traffic have the right of way at a given location.

The perception system 172 also includes one or more components for detecting objects external to the vehicle such as other vehicles, obstacles in the roadway, traffic signals, signs, trees, etc. For example, the perception system 172 may include one or more LIDAR sensors, sonar devices, microphones, radar units, cameras and/or any other detection devices that record data which may be processed by computing devices 110. The sensors of the perception system may detect objects and their characteristics such as location, orientation, size, shape, type, direction and speed of movement, etc. The raw data from the sensors and/or the aforementioned characteristics can be quantified or arranged into a descriptive function or vector and sent for further processing to the computing devices 110. As an example, computing devices 110 may use the positioning system 170 to determine the vehicle's location and perception system 172 to detect and respond to objects when needed to reach the location safely.

Figure 2:
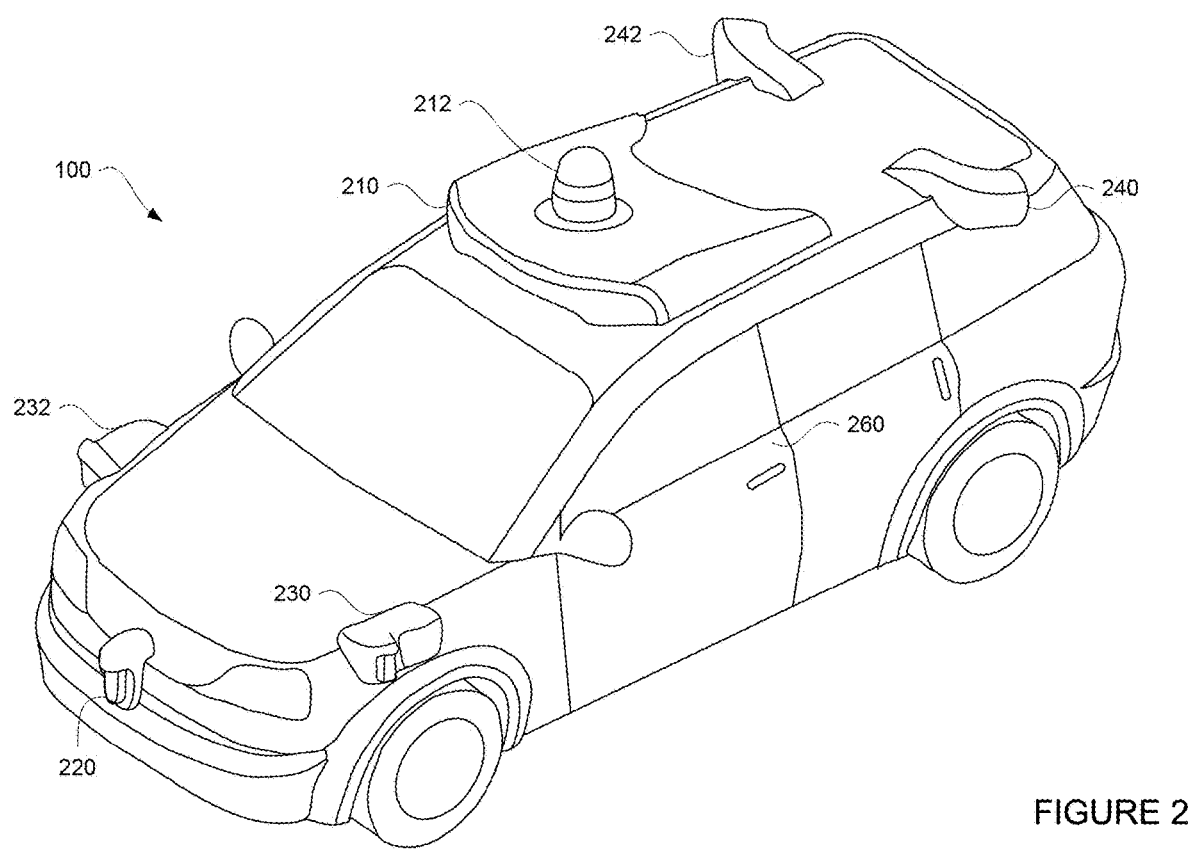
FIG. 2 is an example external view of the example vehicle of FIG. 1 in accordance with aspects of the disclosure.

FIG. 2 is an example external view of vehicle 100 including aspects of the perception system 172. For instance, roof-top housing 210 and dome housing 212 may include a LIDAR sensor or system as well as various cameras and radar units. In addition, housing 220 located at the front end of vehicle 100 and housings 230, 232 on the driver's and passenger's sides of the vehicle may each store a LIDAR sensor or system. For example, housing 230 is located in front of driver door 260. Vehicle 100 also includes housings 240, 242 for radar units and/or cameras also located on the roof of vehicle 100. Additional radar units and cameras (not shown) may be located at the front and rear ends of vehicle 100 and/or on other positions along the roof or roof-top housing 210.

FIG. 3 is an example functional view of a camera 300. The camera 300 includes a lens 310 configured to focus light towards an image sensor 320 which is attached to a controller 330 which can process information from the image sensor. The image sensor 320 may include a plurality of red, green and blue pixels. Each of these pixels may essentially be a photosensor with a filter which allows for red (red pixels), green (green pixels), or blue (blue pixels) light to pass through to the photosensor. The aggregated output values of the red pixels may be referred to as the "red channel" or output values of the red pixels, the aggregated output values of the blue pixels may be referred to as the "blue channel" or output values of the blue pixels, and the aggregated output values of the green pixels may be referred to as the "green channel" or output values of the green pixels. The camera may also include an infrared (IR) filter 340 arranged in front of the sensor which further reduces the light reaching the red filters as well as the light reaching the blue and green filters.

As shown in the example representation of a portion of image sensor 320 of FIG. 4, the pixels may be configured in alternating rows of every other red and green pixels and every other blue and green pixels. In this regard, each row may be a red-green row, such as rows 410, 412, 414, or a blue-green row, such as rows 420, 422, 424. In this regard, there may be twice as many green pixels as blue pixels and twice as many green pixels as red pixels.

The controller 330 may include one or more processors, configured similarly to processors 120, which control the operation of the image sensor 320, for instance by setting the gain and exposure time. As light passes through the lens and hits the pixels of the image sensor 320, an image is captured. The controller 330 receives output from the red, green and blue pixels and generates the corresponding channels values for the image. The controller may be configured to send this information, or rather, the image, to the computing devices 110 for further processing.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

As the vehicle moves along, the sensors of the perception system 172 may sample the vehicle's environment. Referring to camera 300, in order to produce sensor data for processing by the computing devices 110, controller 330 may control the functioning of the respective cameras. In this regard, the controllers may cause each of the cameras to capture images of the vehicle's environment. As noted above, the images may be sent to the vehicle's computing devices for further processing.

In some instances, the computing devices 110 may be able to determine whether the camera's lens has become occluded. As noted above, when a camera is completely completed occluded very little or no light will pass through the filters to the photosensors. This may be the case, for instance, when the lens 310 is covered by debris such as dirt or a plastic bag. As such, output of the red, green and blue pixels will be very low or simply the underlying noise from these pixels will be about the same. Of course, the characteristics of the underlying noise will depend upon the configuration of the camera, the pixels themselves, as well as the gain and exposure time for the camera 300.

Figure 5:
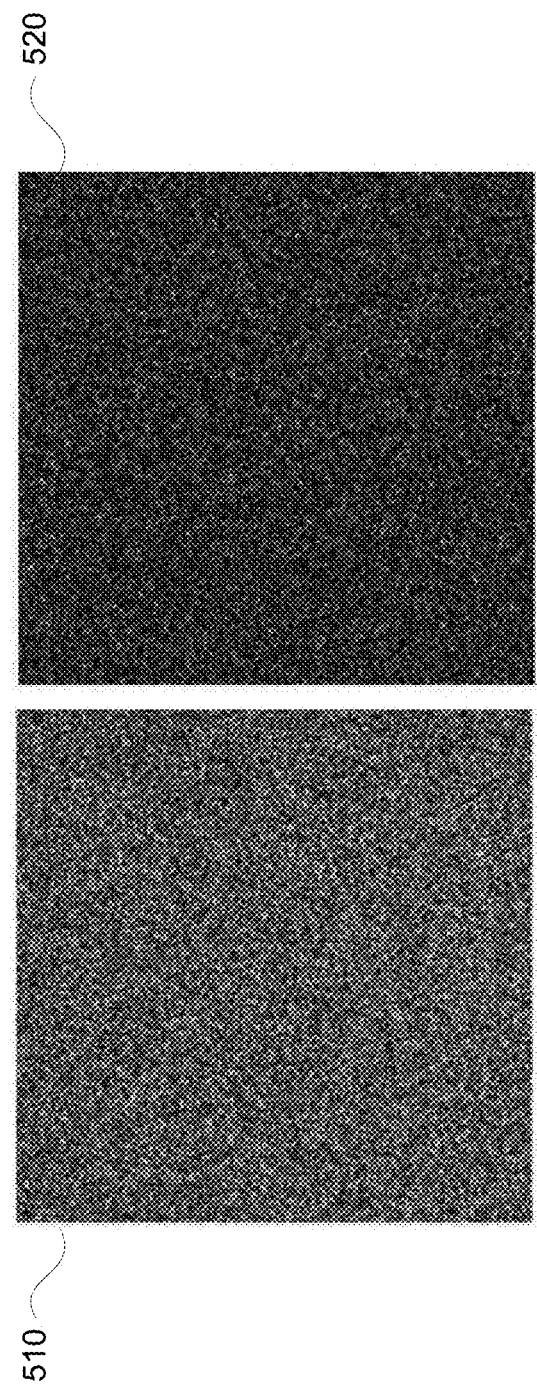
FIG. 5 is example image in accordance with aspects of the disclosure.

However, when the camera is capturing a dark scene, while the output of the red and blue pixels will be very low, the output of the green pixels may be meaningfully greater than the red or the blue pixels. For instance, turning to FIG. 5, image 510 is a portion of a larger image captured of a dark scene. Image 520 is a portion of a larger image captured of an occluded scene. As can be seen, although both images are dark, the dark scene image does capture some light and is slightly brighter, in particular because of the green pixels, than the image captured with an occluded lens. Image 520 is not completely dark, or rather, completely black, because of the noise output by each of the pixels of the image sensor 320.

Figure 6:
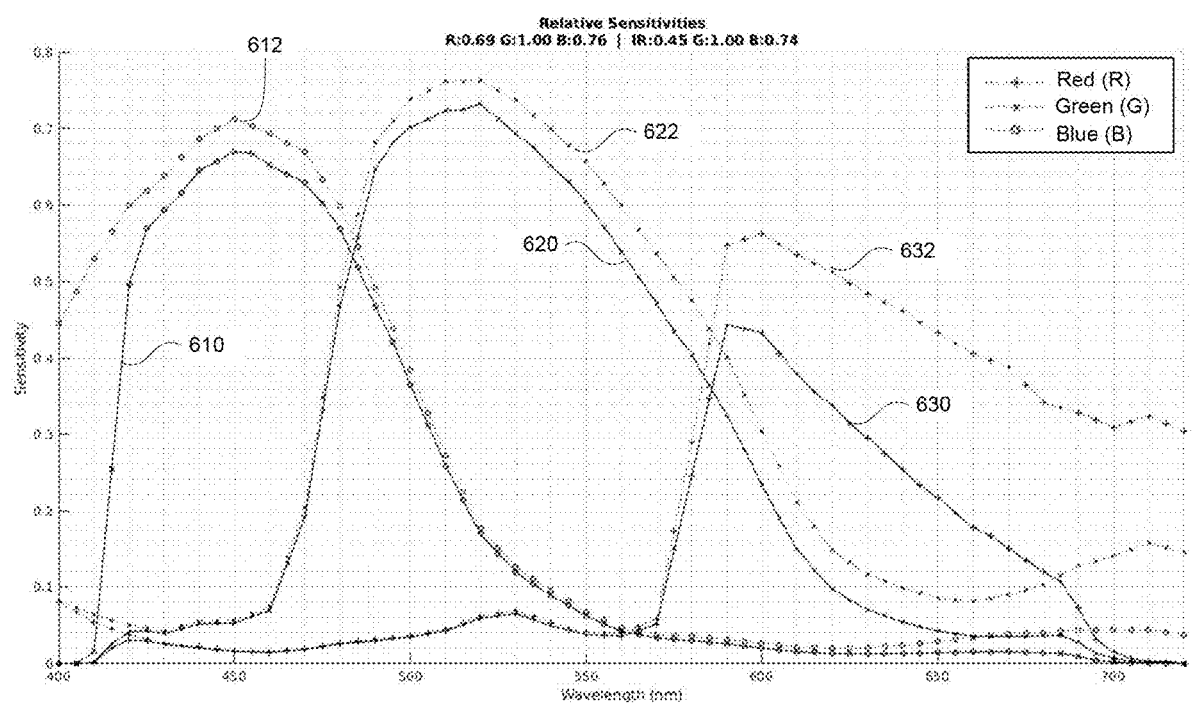
FIG. 6 is an example graphical representation of data in accordance with aspects of the disclosure.

The magnitude of the difference between the output of the green pixels and the red and blue pixels will depend upon the configuration of the camera, the pixels themselves, as well as the gain and exposure time. This is because the green pixels are more sensitive (even when an IR filter is used), for instance on the order of twice as sensitive, than the red and blue pixels. FIG. 6 provides a graphical representation of the relative sensitivities of a camera such as camera 300 at different wavelengths. In this example lines 610, 612 represent sensitivity of blue pixels with and without an IR filter, respectively. Similarly, lines 620, 622 represent sensitivity of green pixels with and without an IR filter, respectively, and lines 630, 632 represent sensitivity of red pixels with and without an IR filter, respectively. As shown, the difference in the values with and without an IR filter is only slight for the blue and the green channels.

In addition, the spectral distribution of light sources encountered during nighttime driving for both natural and artificial light tends to be either neutral (i.e. close to white) or orange (high pressure sodium lamps). Only in very rare cases would a light source have much stronger red and blue components (i.e. if only red or only blue components were much stronger, this would not be an concern), which would increase the values of the red and blue pixels, so that the light source would compensate for the increased green pixel sensitivity. Thus, the approaches described herein may work to detect whether a camera is occluded in almost all dark scenes.

In order to determine whether a camera is occluded or simply capturing a dark scene, the output of red, blue and green channels of an image may be analyzed, for instance by the computing devices 110. This analysis may be independent of the type of camera or filters used so long as the camera includes the aforementioned red, blue, and green combination of pixels, such as is shown in FIG. 4. For instance, the chromaticity of the green channel may be compared to that of the red and blue channels. In this regard, the analysis is independent of the illuminance or lux of the scene captured by the image.

In order to determine the chromaticities, the red, green and blue pixel values for an image must be determined. For instance, the red pixel values "R" may be determined by summing the values of the red pixels from the red-green pixel rows. Similarly, the blue pixel values "B" may be determined by summing the values of the blue pixels from the blue-green pixel rows. The green pixel values "G" may be determined by averaging the values from the green pixels from the red-green pixel rows "Gr" with the values of the blue-green pixel rows "Gb". In this regard, $G=(Gr+Gb)/2$.

The chromaticities of each color pixel may then be determined as a proportion of the total pixel values for the red, blue, and green pixels. For instance, the chromaticity of the red pixels "r" may be determined from $R/(R+B+G)$, and similarly, the c of the blue pixels "b" may be determined from $B/(R+B+G)$. The chromaticity of the green pixels "g" may then be determined from $G/(R+B+G)$.

Because the green pixels are typically compared to a combination of the red and blue pixels, a magenta value, "m", representing a combined chromaticity of the red and blue pixels may be determined. For instance, m may be determined from $M/(R+B+G)$ where $M=(R+B)/2$. The magenta value may provide some convenience and simplicity to the comparisons as discussed further below.

As noted above, in order to determine whether a camera is occluded or capturing a dark scene, the chromaticity of the green channel may be compared to that of the red and blue channels. For instance, g may be compared to r and b. Alternatively, g may be compared to m. If the differences represented by g-r and g-b or g-m are less than a threshold value, the camera is likely to be occluded as this would indicate that all of the pixels are simply outputting noise. Similarly, if the ratios represented by g/r and g/b or g/m, are less than a threshold value, the camera is likely to be occluded as this would indicate that all of the pixels are simply outputting noise. As one example, if the differences g-r and g-b or g-m are less than or very close to zero, the camera is likely to be occluded as very little light is passing to the red, blue and green pixels. Similarly, if the ratios g/r and g/b or g/m are less than or very close to 1, the camera is likely to be occluded as very little light is passing to the red, blue and green pixels.

However, if these differences or ratios are greater than the threshold value, then the camera is likely not occluded as more light being captured by the green pixels than the red pixels or the blue pixels. As one example, if the differences g-r and g-b or g-m are greater than zero, the camera is likely capturing a dark scene as more light is passing to the green pixels. Similarly, if the ratios g/r and g/b or g/m is greater than 1 or, the camera is likely capturing a dark scene as more light is passing to the green pixels.

Figure 7:
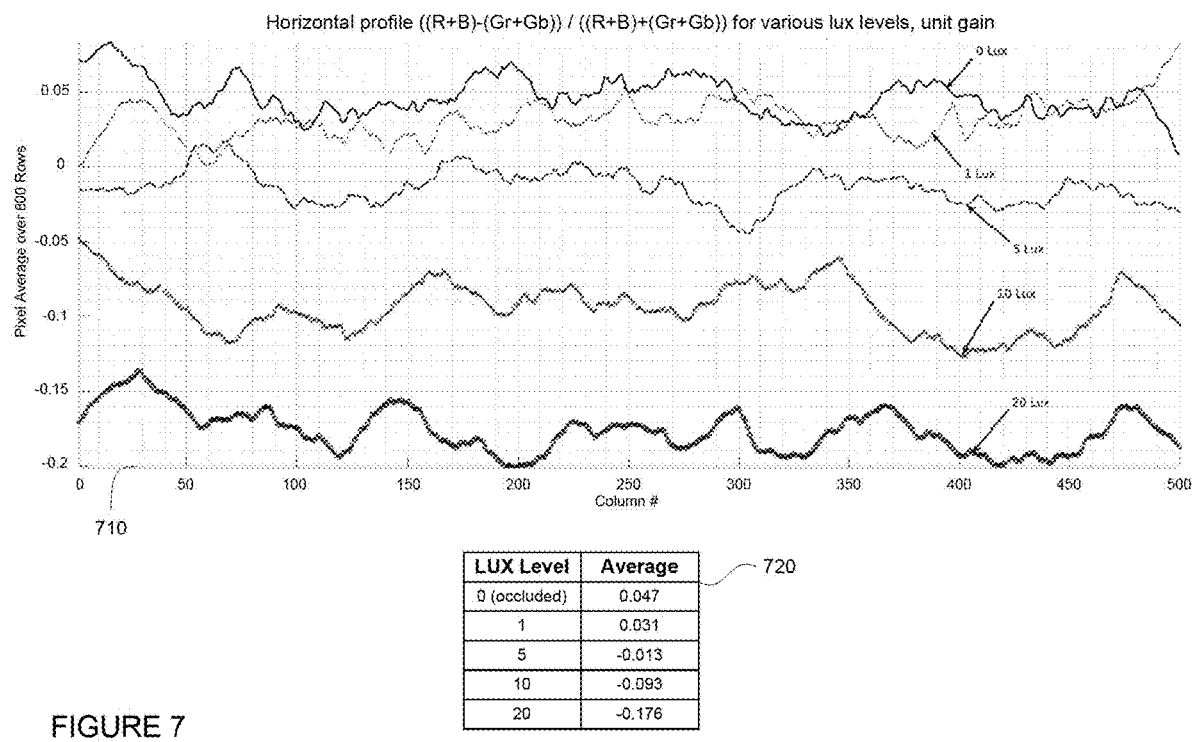
FIG. 7 is an example graphical representation of data and a table in accordance with aspects of the disclosure.
Figure 8:
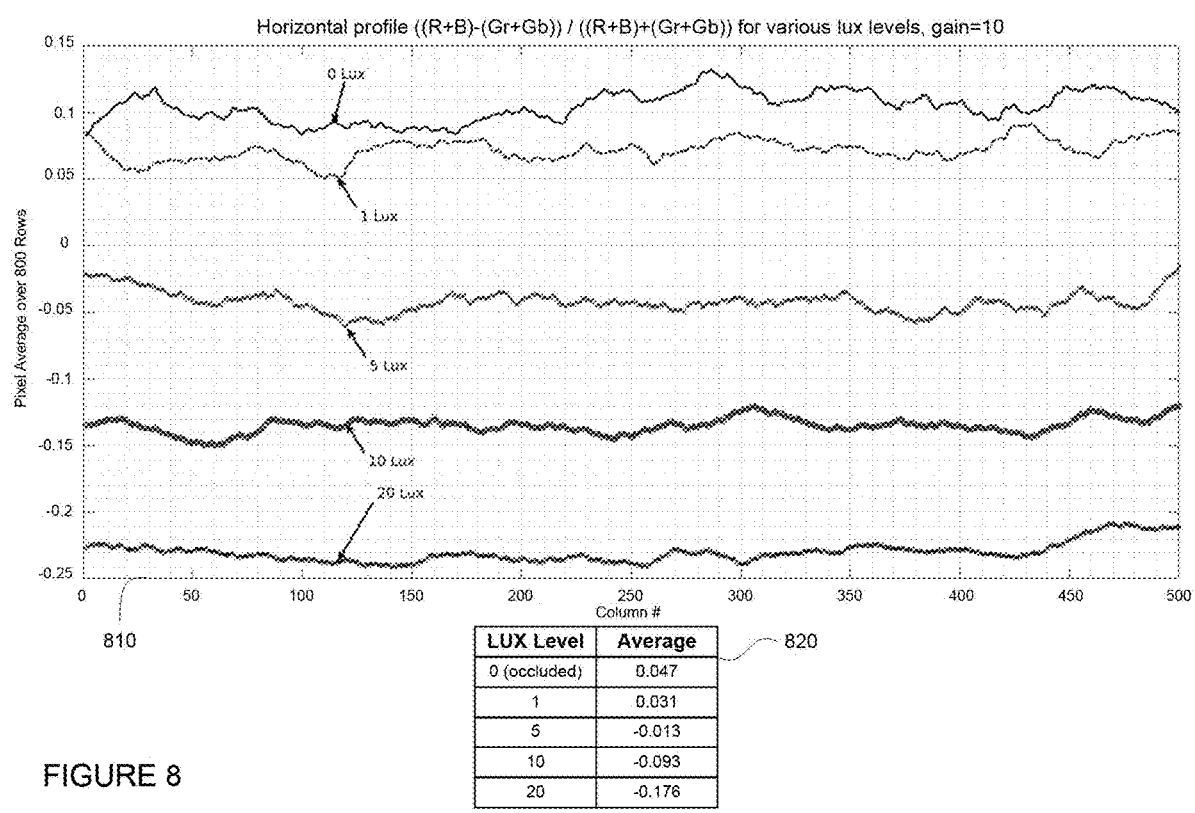
FIG. 8 is another example graphical representation of data and a table in accordance with aspects of the disclosure.

FIGS. 7 and 8 provides an example of a typical horizontal profile 710, 810 over a portion of an image as well as tables 720, 820 that provide the statistical averages for each LUX level (measured in lumens per square meter). This horizontal profile is a line graph that is the average values for each column of pixels. In this example, there are 500 columns and 800 rows. Each point on each line represents the average value for that image column over the number of rows. In this example, the value corresponding to each point for each horizontal profile 710, 810 is computed using the formula ((R+B)−(Gr+Gb))/((R+B)+(Gr+Gb)). The exposure time was consistent for each image captured, and the gain (unit gain) was set to 1 for the example of FIGS. 7 and 10 for the example of FIG. 8. As can be seen from the tables 720, 820, the values change monotonically with the illuminance levels (lux) and increase as the gain increases.

In addition, as be seen from the graphical representations and tables of FIGS. 7 and 8, the actual thresholds used for the ratios and differences may be dependent upon the gain value used to capture the image. For instance, for larger gains, the thresholds will be slightly greater.

To further increase the confidence in this classification process, the absolute noise levels may be used as an additional signal, an initial check or confirmation. For instance, the higher percentiles, for instance $90^{th}$, $95^{th}$, $98^{th}$, etc., of a histogram of the pixel values for all colors (i.e. all of the red, green and blue pixels) can provide insights as to the occluded versus dark scene state. As an example, FIG. 9 provides a table of pixel values for the $95^{th}$ percentile as a function of LUX levels with a gain of 10 (see the example of FIG. 8). In this regard, the $95^{th}$ percentile value is at or above the value corresponding to the non-occluded case. Comparing table 910 to table 820, each of the 95% values is greater than the average values for each LUX level. In other words, once the pixel values are large enough, i.e. greater than some threshold, this may be a strong indication that the camera is not occluded as there is too much light reaching the sensor. This analysis may thus be used by the computing devices 110 to determine whether to do the aforementioned comparisons and/or as a check on the determination of occluded versus a dark scene.

In addition or alternatively, when the brightness of a captured image is very low, rather than comparing the chromaticity of the green pixels to those of the red and blue pixels, the absolute value of the chromaticity of the green pixels may be analyzed independently. In other words, if all of the red, blue and green pixels have very small average output values, similar to values captured during exposures in absolute darkness, it can be assumed that the camera is occluded. This is because it is highly improbable that the camera is located in an environment that dark, especially, if the camera is mounted on a vehicle and the vehicle is currently driving around. For instance, if the chromaticity of the green pixels is greater than a threshold value, this may indicate that at least some light is passing to the green pixels and that the camera is capturing a dark scene. This threshold may correspond to an average pixel value in a well-lit area, such as a well-lit parking lot or other location. If the chromaticity of the green pixels is very small, the chromaticities of the red pixels, blue pixels, and green pixels may become very unstable because the pixel values are divided into very small numbers. As such, rather than comparing chromaticities as discussed above, the absolute value of the averages of the output of the pixels may be used, regardless of color. If these averages are below some threshold value, similar in magnitude to the pixel averages seen during imaging in complete darkness, then this may indicate that the camera is occluded.

Although the examples above relate to processing an entire image, smaller portions of an image may be processed. For instance, smaller regions of interest within the larger image may be analyzed. This may include dividing an image into a grid of regions of interest. For example, an image can be divided into 9 regions of interest, as a 3 by 3 grid. Each region of interest of the grid may then be processed independently to determine whether that particular region is occluded. In this regard, if any (i.e. at least one) of the regions of interest in the grid are occluded, the camera may be determined to be occluded. This may be especially useful in situations in which a camera is only partially occluded.

Once a camera is determined to be occluded, remedial actions may be taken. For instance, the computing devices 110 may cause the camera to be cleaned, taken offline, flagged for maintenance, etc. For example, a signal may be sent by the computing devices 110 to activate a cleaning system in order to clean the camera, as another example, a message may be sent to a human operator indicating that the camera is occluded. As another example, if the camera is attached to a vehicle having an autonomous driving mode, and the determination may be used by the computing devices 110 to control the vehicle in the autonomous driving mode in a particular way or according to particular behaviors for instance, by driving slower and/or discarding information captured by the camera until the camera is cleaned or no longer occluded.

Figure 10:
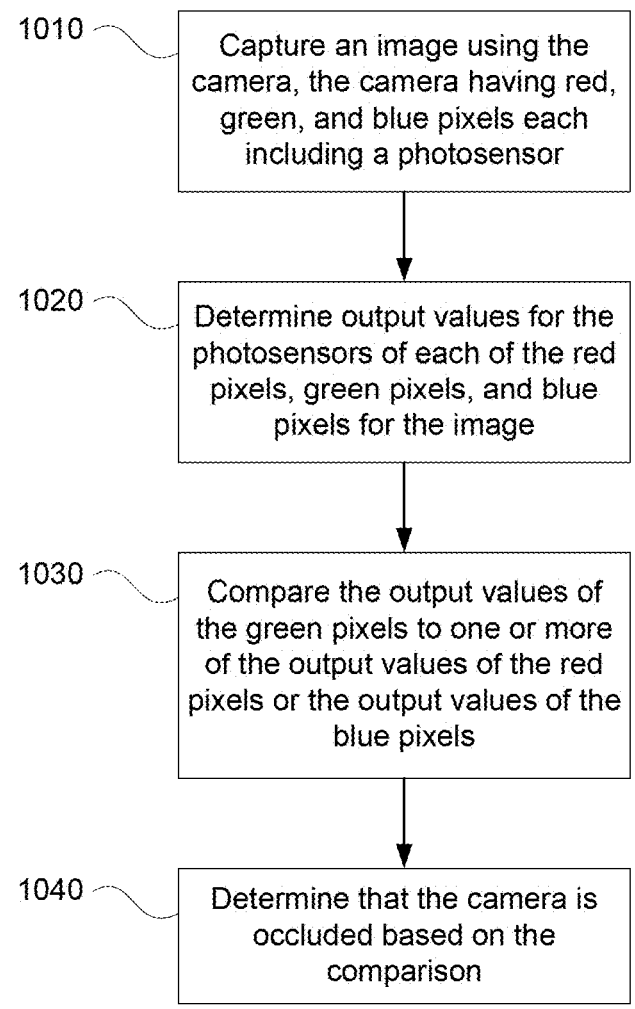
FIG. 10 is an example flow diagram in accordance with aspects of the disclosure.

FIG. 10 is an example flow diagram 1000 for determining whether a camera is occluded in accordance with some of the aspects described herein. The example flow diagram refers to a system including a camera, such as camera 300 and one or more computing devices having one or more processors, such as one or more processors 120 of one or more computing devices 110. For instance, at block 1010, an image is captured using the camera. The camera has red, green, and blue pixels each including a photosensor. At block 1020, output values for the photosensors of each of the red pixels, green pixels, and blue pixels for the image are determined. At block 1030, the output values of the green pixels are compared to one or more of the output values of the red pixels or the output values of the blue pixels. At block 1040, that the camera is occluded is determined based on the comparison.

Alternatively, rather than having a separate computing device, such as computing devices 110, perform the various operations discussed above, these operations may be performed by one or more processors, for instance, of the controller 330. In addition, although the examples above relate to controlling vehicles having an autonomous driving mode, identifying whether a camera is occluded as described above may also be useful for other systems as well. For example, in a hand-held camera or mobile device (such as a phone, tablet, etc.) with a camera, when the user is using a camera functionality of the device, the features described herein can be used to determine whether the camera is occluded (such as by a user's finger). In the event that the camera is determined to be occluded, the user could automatically be alerted by audio, visual, and.or tactile (e.g. vibration) ques. This, in turn, may cause the user to remedy the occlusion before attempting to capture an image and/or video.

The features described herein may allow for the detection of whether a camera is observing something dark or simply occluded using a simple yet effective analysis and thereby improving the operation of the camera. This determination may be made in real time, for instance, by processors of the camera or remote processing devices. Thus, the functionality of the camera can be self-assessed or automatically assessed and used to determine whether to clean the camera and/or notify a human operator. This can be especially useful in certain situations where the occlusion cannot be easily identified from a visual inspection by a human operator, for instance, because camera is not easily accessible or no human operator is available. Similarly, as noted above, this technology is also useful in situations where critical decisions are made in real time using such images, such as in the case of autonomous vehicles which use camera images to make driving decisions.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A camera comprising:
   an image sensor including a plurality of photosensors, each photosensor of the plurality of photosensors having one of a plurality of differently colored pixels; and
   a controller including one or more processors operably coupled to the image sensor, wherein the one or more processors are configured to:
   determine output values for the plurality of photosensors for an image;
   compare the output values for the plurality of photosensors corresponding to pixels having a first color to one or more of the output values for the plurality of photosensors corresponding to pixels having a second color; and
   determine, based on results of the comparison, whether the camera is occluded.

2. The camera of claim 1, further comprising:
   a lens configured to focus light towards the image sensor; and
   an infrared (IR) filter: arranged in front of the image sensor.

3. The camera of claim 1, wherein the plurality of differently colored pixels include red, green, and blue pixels.

4. The camera of claim 1, wherein the controller is further configured to control the image sensor to set gain and exposure time.

5. The camera of claim 1, wherein each of the plurality of differently colored pixels includes a filter which allows a particular color of light to pass through to the photosensor.

6. The camera of claim 1, wherein the plurality of differently colored pixels is configured in alternating rows of pixels.

7. The camera of claim 6, where one of the alternating rows includes red and green pixels.

8. The camera of claim 7, where another one of the alternating rows includes blue and green pixels.

9. The camera of claim 8, wherein there are twice as many green pixels as blue pixels, and twice as many green pixels as red pixels.

10. The camera of claim 1, further comprising a cleaning system configured to clean the camera when the camera is occluded.

11. The camera of claim 1, wherein the one or more processors are further configured to determine chromaticities of the output values for the image.

12. The camera of claim 1, wherein chromaticities of each color pixel are determined as a proportion of total pixel values for each color pixel.

13. A method comprising:
    determining, by one or more processors of a controller of a camera, output values for a plurality of photosensors for an image, each photosensor of the plurality of photosensors having one of a plurality of differently colored pixels;
    comparing, by the one or more processors, the output values for the plurality of photosensors corresponding to pixels having a first color to one or more of the output values for the plurality of photosensors corresponding to pixels having a second color; and
    determining, by the one or more processors based on results of the comparing, whether the camera is occluded.

14. The method of claim 13, wherein the plurality of photosensors are comprised by an image sensor of the camera.

15. The method of claim 14, further comprising:
    controlling, by the one or more processors, the image sensor to set gain and exposure time.

16. The method of claim 13, wherein the plurality of differently colored pixels include red, green, and blue pixels.

17. The method of claim 13, wherein the plurality of differently colored pixels is configured in alternating rows of pixels.

18. The method of claim 13, further comprising:
    determining, by the one or more processors, chromaticities of the output values for the image.

19. The method of claim 18, wherein chromaticities of each color pixel are determined as a proportion of total pixel values for each color pixel.

20. The method of claim 13, further comprising:
    analyzing, by the one or more processors, an output of red, blue and green channels of the image.

* * * * *

UNITED STATES PATENT AND TRADEMARK OFFICE
CERTIFICATE OF CORRECTION

Page 1 of 1

PATENT NO. : 12,014,524 B2
APPLICATION NO. : 18/140225
DATED : June 18, 2024
INVENTOR(S) : Vlad Cardei and Carl Warren Craddock It is certified that error appears in the above-identified patent and that said Letters Patent is hereby corrected as shown below:

In the Claims

Claim 5, Column 12, Line 8:
Now reads: "to the photosensor"; should read -- to a corresponding one of the plurality of photosensors --

Signed and Sealed this
Thirteenth Day of August, 2024

Katherine Kelly Vidal
*Director of the United States Patent and Trademark Office*